April 6, 1926.

A. LOWNDES 1,579,219

AUTOMATIC WEIGHING SCALE

Filed July 6, 1925   2 Sheets-Sheet 1

Inventor,
Arthur Lowndes
By, Frederick C. Bromley
Atty.

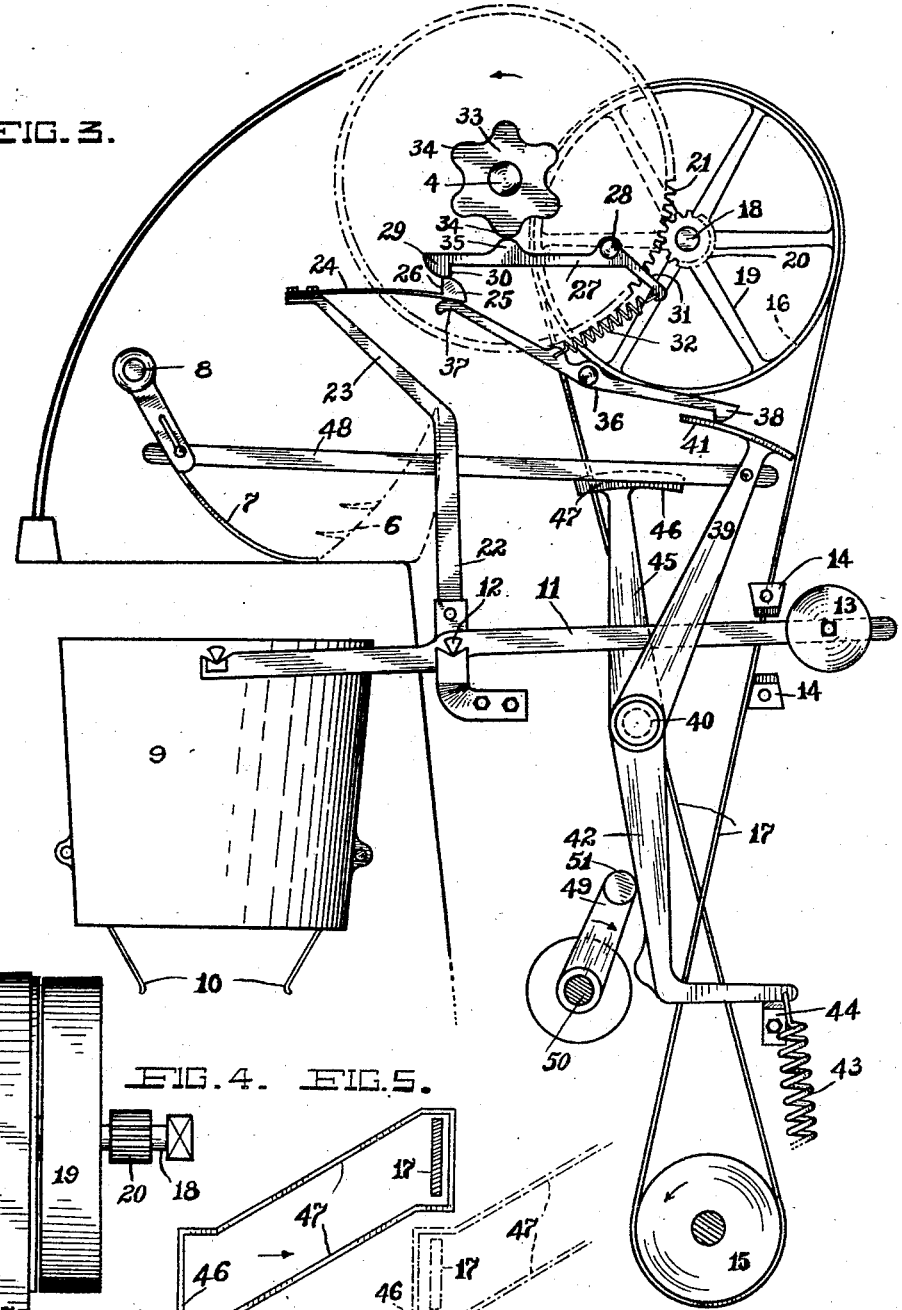

Patented Apr. 6, 1926.

1,579,219

UNITED STATES PATENT OFFICE.

ARTHUR LOWNDES, OF TORONTO, ONTARIO, CANADA.

AUTOMATIC WEIGHING SCALE.

Application filed July 6, 1925. Serial No. 41,762.

*To all whom it may concern:*

Be it known that I, ARTHUR LOWNDES, a subject of the King of Great Britain, resident of the city of Toronto, in the Province of Ontario, in the Dominion of Canada, have invented new and useful Improvements in Automatic Weighing Scales, of which the following is a specification.

The invention relates to improvements in automatic weighing scales as described in the present specification and shown in the accompanying drawings which form part of the same.

The invention appertains to weighing scales of the kind employed in weighing wool as it passes from the feed mechanism of a carding machine. This feed mechanism usually comprises an apron that receives wool from a source of supply and delivers it to a back comb arm, which arm combs the wool from the apron and drops it into the pan of a weighing scale. Upon sufficient wool being thus delivered to the pan to balance the scale its beam actuates a trip mechanism that in turn shifts the driving belt of the apron onto a loose pulley and stops the feed of the wool to the back arm. Simultaneously, a gate is closed to prevent further wool dropping into the pan until it is emptied of its load in preparation for a recurrence of the operation.

Since wool is a light weight material, the scale employed must necessarily be very sensitive and, therefore, any mechanism connecting or contacting with its beam before it balances or floats in each weighing operation to effect the tripping of the belt shifter, would destroy the accuracy of the scale.

It is therefore the object of the present invention to so devise a trip mechanism that none of its parts will contact with the scale beam until it actually floats or balances, thus ensuring precision of weighing.

A further object of this invention is to provide for the actuation of the aforesaid gate simultaneously with the shifting of the belt onto its loose pulley.

The invention consists substantially of a scale beam provided with an arm terminating in a resilient head that is so positioned that as the scale beam floats such arm is swung into the path of an oscillating member in order that its descent will depress the flexible head sufficiently to actuate a trigger that in turn releases the belt shift mechanism for the purpose of moving the belt onto a loose pulley and thus rendering the driving mechanism idle.

A very distinctive feature resides in the action between the belt shift mechanism and the gate whereby the latter is actuated concurrently with the shifting of the belt onto its loose pulley.

Figure 3 is a side elevation of the weighing scale and trip mechanism associated with the gear train, the apron and comb arm being omitted therefrom. In this view the weighing scale is depicted with its pan lowered, the gate closed, and the trip mechanism actuated with the belt shifted onto its loose pulley.

Figure 4 is a side elevation of the pulleys' shaft showing a partial view of the belt passing over the fast pulley and the portion of the belt shifter encircling it. This view depicts this mechanism in the position it occupies in Figure 1.

Figure 5 is a plan view of the belt and its shifter taken on the line 5—5 of Figure 4.

Like numerals of reference indicate corresponding parts in each figure throughout the drawings.

Figure 1:
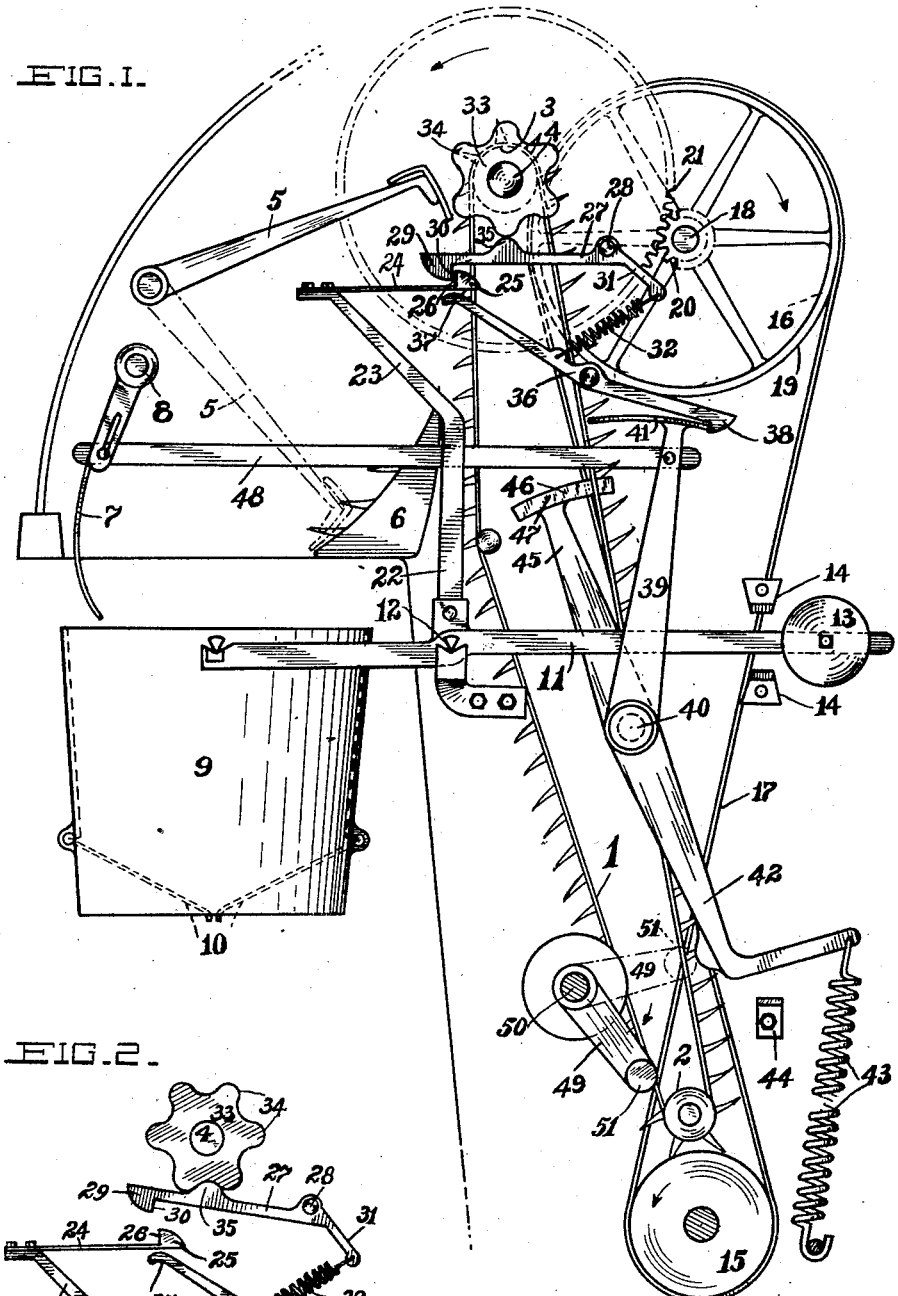
Figure 1 is a side elevation of the feed mechanism and weighing scale of a carding machine showing the invention applied thereto. In this view the weighing scale is depicted in an approximately balanced position, the comb arm in its secondary position being shown in dotted outline, and the gate in its open position.
Figure 2:
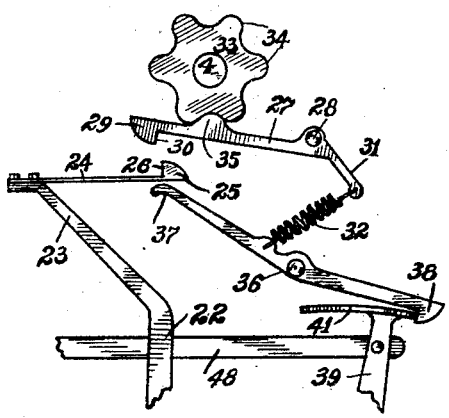
Figure 2 is a fragmentary view of the trip mechanism exhibiting the oscillatory member in a raised position.

In the drawings, the reference numeral 1 indicates the apron, which takes the form of an endless conveyor running over the bottom drum 2 and the top drum 3; this top drum being mounted on a shaft 4 by which it is driven by means of suitable gearing hereinafter described.

5 is the back comb arm which oscillates continuously from one to the other of the positions depicted in Figure 1.

6 is a back comb stripper which removes the particles of wool adhering to the back comb arm on each return stroke.

7 is the gate which swings on its pivot 8 from the open position shown in Figure 1 to its closed position illustrated in Figure 3. Beneath the gate 7 is the pan 9 of the weighing scale, which has a hinged bottom 10 so arranged that it automatically empties its load upon the pan descending, the contents being deposited upon the endless conveyor which, together with the automatic mechanism of the pan bottom, is not shown in the drawings as they do not constitute a part of the present invention.

The pan is supported upon one side of a scale beam 11 that is fulcrumed at 12 and carries a weight 13 on its other side which balances the pan when the desired quantity of wool has been fed to it. In close proximity to said weight 13 is an upper and lower stop 14 for limiting the movement of the scale beam.

The gear train for operating the shaft 4 of the apron comprises a driving pulley 15 which is continuously driven from any source of motive power (not shown in the drawing) and is connected to a fast pulley 16 by a crossed belt 17. This pulley is keyed to a shaft 18 and is positioned in close proximity to a loose pulley 19, so that, in order to render the apron inoperative, the belt is shifted onto this loose pulley.

20 is a pinion keyed to the shaft that carries the tight and loose pulleys and meshes with a comparatively large spur gear 21 likewise mounted on the shaft 4, thus transmitting power to the apron drum at a substantial speed ratio.

Having recounted the various parts of the carding machine to which the present invention is related, the invention itself will now be described.

22 is an arm rising from the scale beam 11 at its fulcrum and being substantially offset, as at 23, on the pan side of the beam at an acute angle. The distal end of this arm carries a flat steel spring 24 that is horizontally arranged, and has an enlarged head or end 25 provided with a flat vertical face 26. This head is situated over the fulcrum 12 of the scale beam, so that, upon pressure being applied downwardly thereupon, the line of action of the force will intersect the fulcrum, and, therefore, have no component which would induce the beam to rotate about its pivotal axis.

27 is a trip pivoted at 28. This trip extends horizontally and is provided with a head 29 similar to the head 25 of the spring 24, but is in an inverted position; the vertical face of the trip head being positioned on the inner side of the head 25 so that when the scale beam is raised at its weighted end the faces of these heads will contact one with the other, that is provided the trip is in its lowered position as seen in Figure 1. 30 indicates the face of this head.

31 is an extension integral with, or secured to, the trip 27, the end of this extension 31 being connected to a tension spring 32 so as to urge the trip upwardly.

33 is a wheel rigidly mounted on the shaft 4, the periphery of which is provided with a number of uniform cams 34 equally spaced therearound.

35 is a follower integral with the trip 27 and pressed to contact with the wheel 33 by the spring 32, so that, as this wheel revolves, its cam periphery will alternately raise and lower the trip 27 in an oscillatory manner.

36 is a trigger pivotally connected intermediate of its length and terminating at one end in a finger 37 that lies beneath the head 25 of the spring 24 in close proximity thereto, while the other end of this trigger forms a pawl 38.

39 is an actuator, one half of which rises from a pivot 40 and terminates in a broad arcuate face 41, one edge of which engages the pawl 38 so as to prevent its movement in that direction during engagement, while the other half 42 extends downwardly from the pivotal connection 40 and is connected to a substantial tension spring 43 which urges it in the direction in which the pawl 38 restricts the upper half.

44 is a fixed stop located beneath the lower half 42 of the actuator. 45 is a belt shifter arm fixedly secured to the boss of the actuator 39 at its pivot 40 so as to move in unison therewith. The free end of this arm carries a belt shifter proper 46 encircling the belt 17. This shifter is band shaped and has substantial oblique sides 47, clearly discernible in Figure 5, so that the shifter in moving around its pivotal connection will cause the sides 47 of this band to engage the belt and move it laterally according to the direction in which the shifter is moved. By reference to Figure 5 the second position of this band will be seen in outline.

48 is a connecting rod extending between the upper half of the actuator 39 and the gate 7 so as to form a pivotal connection therebetween in order to actuate the gate simultaneously with the belt shifter.

49 is a cam carried on a shaft 50 that is geared to the mechanism that operates the conveyor for taking away the wool from the scale pan 9, this mechanism not being shown in the drawing as it does not form a part of the present invention. The end 51 of this cam engages the lower half 42 of the actuator and forces it outwardly subsequent to each tripping operation, so that its arcuate face 41 will engage the pawl 38. This cam is driven at a much lower speed than the gear train for actuating the apron and is timed in relation therewith so that contact with the actuator will be made by its end 51 at the proper time.

In the operation of the invention, the driving pulley 15 transmits power through the belt 17 to the fast pulley 16, motion in turn being communicated by the meshing gears 20 and 21 to the drum 3 of the apron 1. As the wool is carried up one side of this apron, upon its descending on the other side it is combed off by the comb-arm 5 and dropped into the scale-pan 9.

When the pan has received sufficient wool to balance the weight 13, the beam 11 floats in the usual manner, its slight fluctuation swinging the head 25 of the spring 24 into the path of the head 29 of the trip 27, or, should this trip be lowered at this time, the faces 26 and 30 of the heads will merely contact, in which event such contact will be a momentary one as the rotation of the wheel 33 will permit of the trip rising and allowing the head 25 to pass thereunder. The subsequent descent of the trip bends the spring 24 downwardly depressing the upper half 37 of the trigger 36 as depicted in Figure 3 and raising the pawl 38 sufficiently to permit of the spring 43 imparting a quick motion to the actuator 39. Since the belt shifter 45 is connected to this actuator, these members move together, shifting the belt 17 onto its loose pulley 19 and thus arresting the apron's movement. Simultaneously with the shifting of the belt, the connecting rod 48 closes the gate 7. Figure 3 depicts the actuator and belt shifter in their tripped positions with the lower part of the actuator bearing against the stop 44, and its arcuate face supporting the pawl 38.

The cam 49 is so timed that immediately the scale reverts to a receiving position it encounters the lower half 42 of the actuator 39 and urges it against the pressure of the spring 43 sufficiently to permit of the pawl 38 clicking over one edge of the arcuate face 41, where it is locked and held for recurrent operation.

Whereas this invention has been shown in its application to a carding machine, it will be readily apparent to those skilled in the art that it is equally applicable to other analogous machines.

What I claim is:—

1. In an automatic weighing scale of the class described, a scale beam, a movable member, a depressible member carried by said beam so arranged that by the floating of the beam it is swung into the path of said movable member which depresses it thereat; a driving unit, a driven unit connected therewith, and mechanism operable by the depressible member for disconnecting the driven from the driving unit.

2. In an automatic weighing scale of the class described, a scale beam, a movable member, a depressible member carried by said beam so arranged that by the floating of the beam it is swung into the path of said movable member which depresses it thereat, a driving unit, a driven unit connected therewith, mechanism operable by the depressible member for disconnecting the driven from the driving unit, and means for re-engaging the driven unit with its driver.

3. In an automatic weighing scale of the class described, a scale beam, a movable member, a depressible member carried by said beam so arranged that by the floating of the beam it is swung into the path of said movable member which depresses it thereat, a driving unit, a driven unit connected therewith, mechanism operable by the depressible member for disconnecting the driven from the driving unit, and means separate and distinct from said mechanism for re-engaging the driven unit with its driver.

4. In an automatic weighing scale of the class described, a scale beam, a movable member, a depressible member carried by said beam so arranged that by the floating of the beam it is swung into the path of said movable member which depresses it thereat, a trigger operable by the depression thereof, a driving unit, a driven unit connected therewith, and mechanism releasable by said trigger for disconnecting the driven from the driving unit.

5. In an automatic weighing scale of the class described, a scale beam, a movable member, a depressible member carried by said beam so arranged that by the floating of the beam it is swung into the path of said movable member which depresses it thereat, a trigger operable by the depression thereof, a driving unit, a driven unit connected therewith, mechanism releasable by said trigger for disconnecting the driven from the driving unit, and means for re-engaging the driven unit with its driver.

6. In an automatic weighing scale of the class described, a scale beam, a movable member, a depressible member carried by said beam so arranged that by the floating of the beam it is swung into the path of said movable member which depresses it thereat, a trigger operable by the depression thereof, a driving unit, a driven unit connected therewith, mechanism releasable by said trigger for disconnecting the driven from the driving unit, and means separate and distinct from said mechanism for re-engaging the driven unit with its driver.

7. In an automatic weighing scale of the class described, a scale beam, an oscillatory member, a depressible member carried by said beam so arranged that by the floating of the beam it is swung into the path of said oscillatory member which depresses it thereat, a driving unit, a driven unit connected therewith, and mechanism operable by the depressible member for disconnecting the driven from the driving unit.

8. In an automatic weighing scale of the class described, a scale beam, an oscillatory member, a depressible member carried by said beam so arranged that by the floating of the beam it is swung into the path of said oscillatory member which depresses it thereat, a driving unit, a driven unit connected therewith, mechanism operable by the depressible member for disconnecting the driven from the driving unit, and means for re-engaging these units.

9. In an automatic weighing scale of the class described, a scale beam, an oscillatory member, a depressible member carried by said beam so arranged that by the floating of the beam it is swung into the path of said oscillatory member which depresses it thereat, a driving unit, a driven unit connected therewith, mechanism operable by the depressible member for disconnecting the driven from the driving unit, and means separate and distinct from said mechanism for re-engaging the driven unit with its driver.

10. In an automatic weighing scale of the class described, a scale beam, an oscillatory member, a depressible member carried by said beam so arranged that by the floating of the beam it is swung into the path of said oscillatory member which depresses it thereat, a trigger operable by the depression thereof, a driving unit, a driven unit connected therewith, and mechanism releasable by said trigger for disconnecting the driven from the driving unit.

11. In an automatic weighing scale of the class described, a scale beam, an oscillatory member, a depressible member carried by said beam so arranged that by the floating of the beam it is swung into the path of said oscillatory member which depresses it thereat, a trigger operable by depression thereof, a driving unit, a driven unit connected therewith, mechanism releasable by said trigger for disconnecting the driven from the driving unit, and means for re-engaging the driven unit with its driver.

12. In an automatic weighing scale of the class described, a scale beam, an oscillatory member, a depressible member carried by said beam so arranged that by the floating of the beam it is swung into the path of said oscillatory member which depresses it thereat, a trigger operable by the depression thereof, a driving unit, a driven unit connected therewith, mechanism releasable by said trigger for disconnecting the driven from the driving unit, and means separate and distinct from said mechanism for re-engaging the driven unit with its driver.

13. In an automatic weighing scale, a scale beam, an oscillatory member, an arm extending from said scale beam and provided with a resilient terminus, so arranged that by the floating of the beam it is swung into the path of the oscillatory member which depresses it thereat, a trigger operable by the depression thereof, a driving unit, a driven unit connected therewith, and mechanism releasable by said trigger for disconnecting the driven from the driving unit.

14. In an automatic weighing scale of the class described, a scale beam, a cam wheel, a trip, a spring urging said trip into engagement with said cam wheel, an arm extending from said scale beam and provided with a resilient terminus so arranged that by the floating of the beam it is swung into the path of said trip which depresses it thereat, a trigger operable by the depression thereof, a driving unit, a driven unit connected therewith, and mechanism releasable by said trigger for disconnecting the driven from the driving unit.

15. In an automatic weighing scale of the class described, a scale beam, a cam wheel, means for effecting its rotation, a trip, a spring urging said trip into engagement with said cam wheel, an arm extending from said scale beam and provided with a resilient terminus so arranged that by the floating of the beam it is swung into the path of said trip which depresses it thereat, a finger operable by the depression thereof, a pawl connected to said finger, a driving unit, a driven unit connected therewith, and mechanism releasable by said pawl for disconnecting the driven from the driving unit.

16. In an automatic weighing scale of the class described, a scale beam, an oscillatory member, an arm extending from said scale beam and provided with a resilient terminus, so arranged that by the floating of the beam it is swung into the path of the oscillatory member which depresses it thereat, a trigger operable by the depression thereof, a driving unit, a driven unit connected therewith, an actuator engageable with said trigger, a spring exerting pressure thereon, and means for disconnecting the driven from the driving unit through the movement of said actuator.

17. In an automatic weighing scale of the class described, a scale beam, an oscillatory member, an arm extending from said scale beam and provided with a resilient terminus, so arranged that by the floating of the beam it is swung into the path of the oscillatory member, which depresses it thereat, a trigger operable by the depression thereof, a driving unit, a driven unit connected therewith, an actuator engageable with said trigger, a spring exerting pressure thereon, means for disconnecting the driven from the driving unit through the movement of said actuator in one direction, and means for moving said actuator in the opposite direction in order to re-engage these units.

18. In an automatic weighing scale of the class described, a scale beam, an oscillatory member, an arm extending from said scale beam and provided with a resilient terminus, so arranged that by the floating of the beam it is swung into the path of the oscillatory member which depresses it thereat, a trigger operable by the depression thereof, a driving unit, a driven unit connected therewith, an actuator engageable with said trigger, a spring exerting pressure thereon, means for disconnecting the driven from the driving unit through the movement of said actuator, a gate, and a connecting rod extending therefrom to the actuator in order to close said gate simultaneously with the disengagement of these units.

19. In an automatic weighing scale of the class described, a scale beam, a shaft, a wheel rigidly mounted thereon and having cams arranged around its periphery, means to rotate said wheel, a pivoted trip provided with a head at its free end, a follower carried by said trip, a spring urging said follower into engagement with said wheel, an arm extending upwardly from the aforesaid scale beam over its fulcrum, the upper end of said arm being bent, a flat spring horizontally extending from the bent end of said arm, said flat spring terminating in a head that lies over the fulcrum of the scale beam and is depressible by the head of said trip in the floating of the scale beam, a pivoted finger having its free end lying beneath the head of the aforesaid flat spring, a pawl integral with said finger, a pivoted actuator having a broad arcuate face, one edge of which is engageable with said pawl, a spring exerting pressure on said actuator, a belt shifter affixed to said actuator, and means for urging said actuator against its spring pressure.

Signed at the city of Toronto, in the Dominion of Canada, this 29th day of June 1925.

ARTHUR LOWNDES.